Oct. 27, 1942.    S. R. TEAGER    2,300,280
APPARATUS FOR SWEEPING
Filed Oct. 8, 1938    9 Sheets-Sheet 2
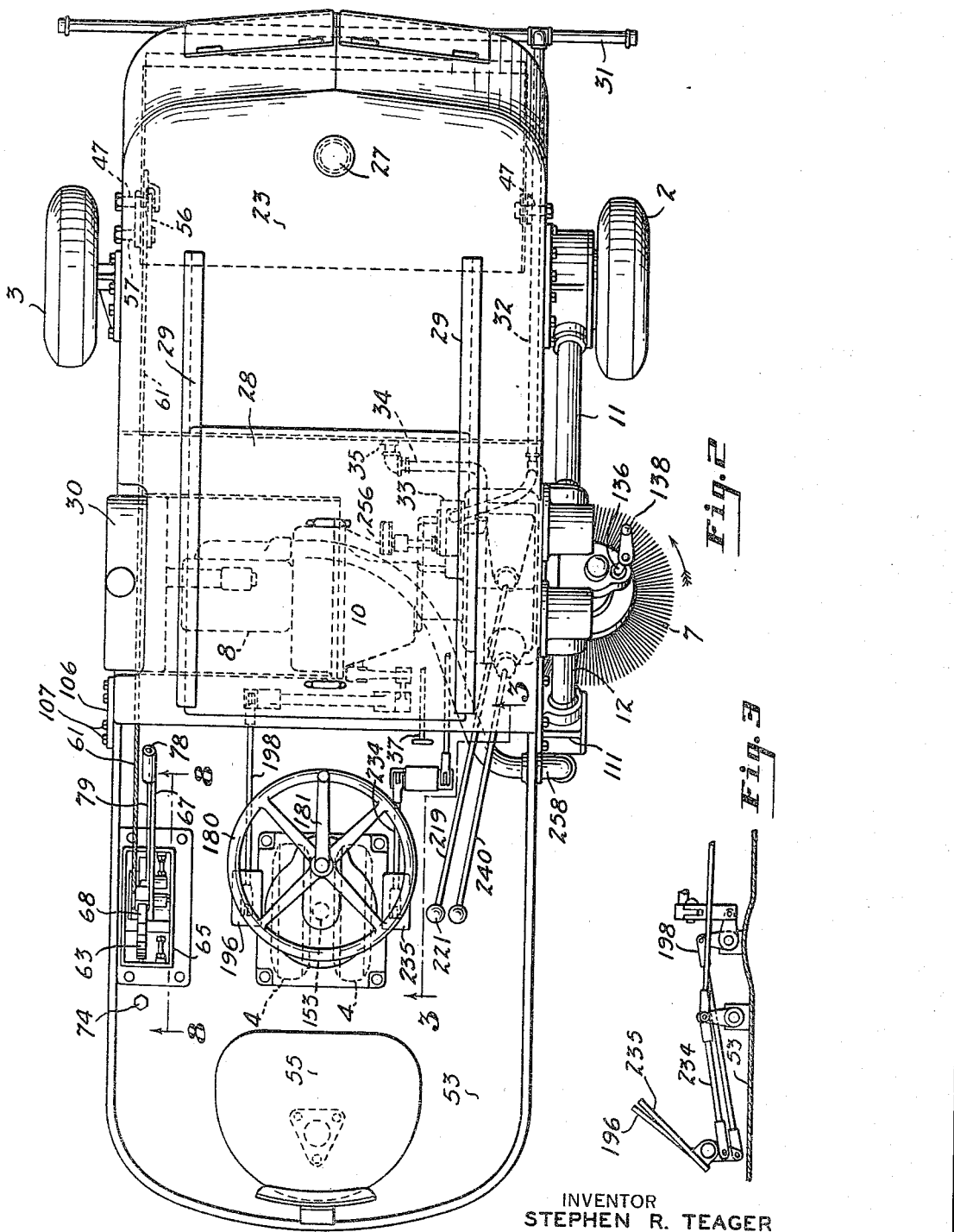
INVENTOR
STEPHEN R. TEAGER
BY
Evans & McCoy
ATTORNEYS

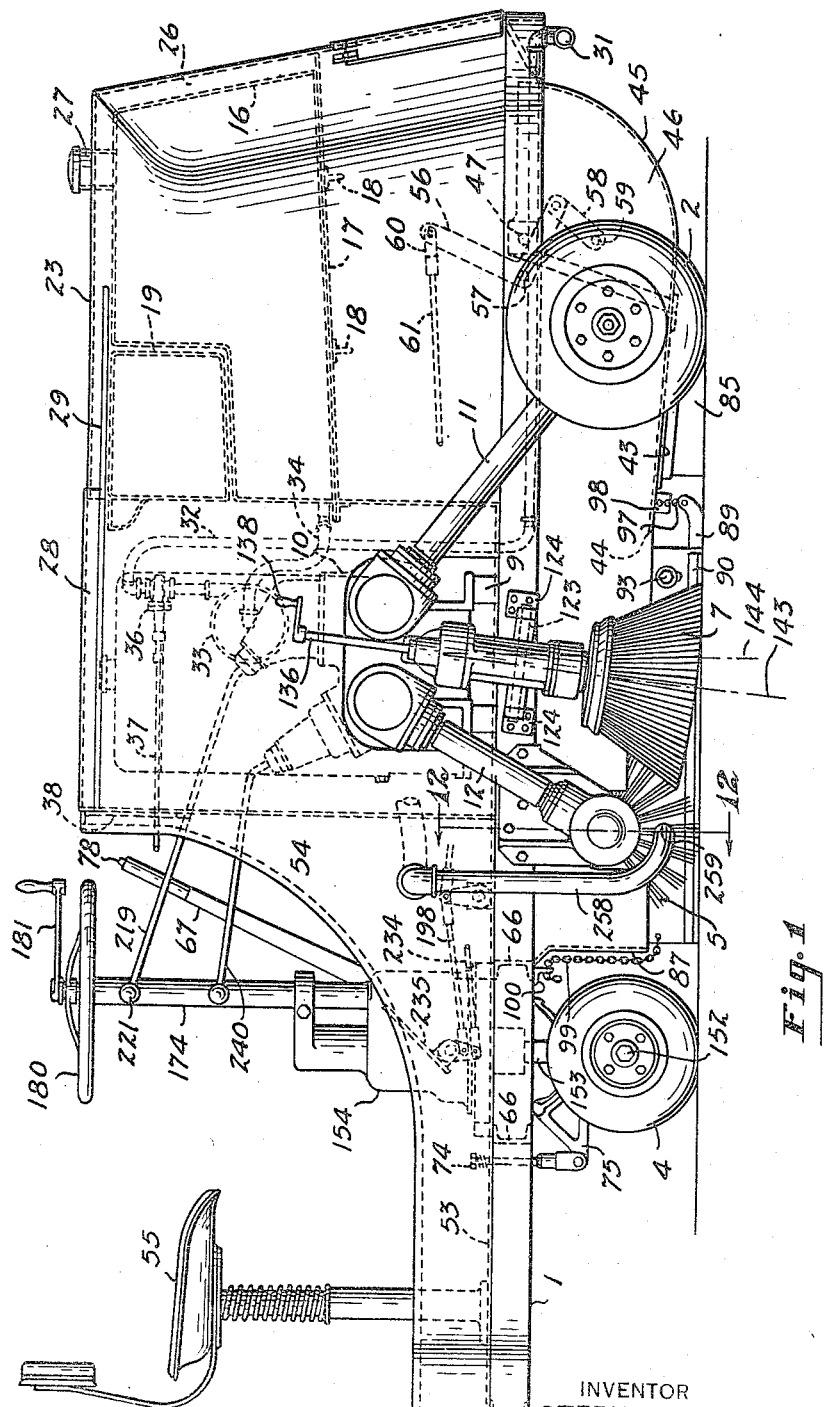

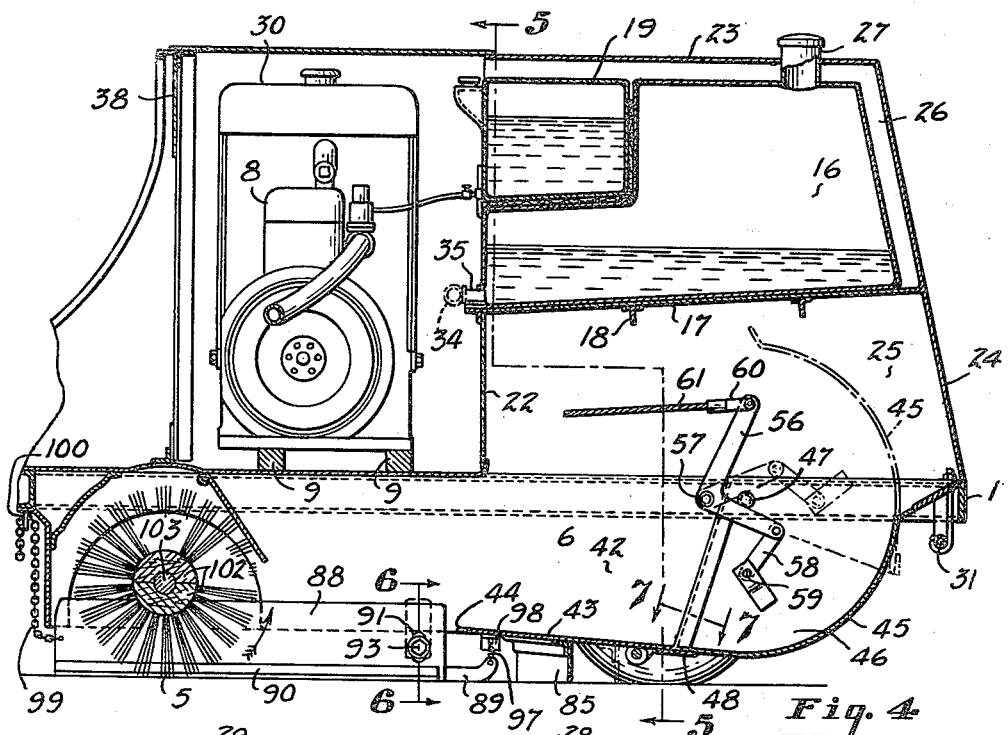
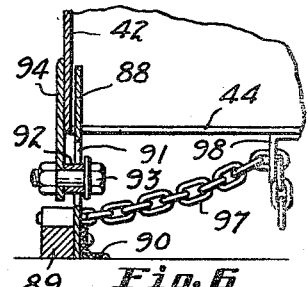
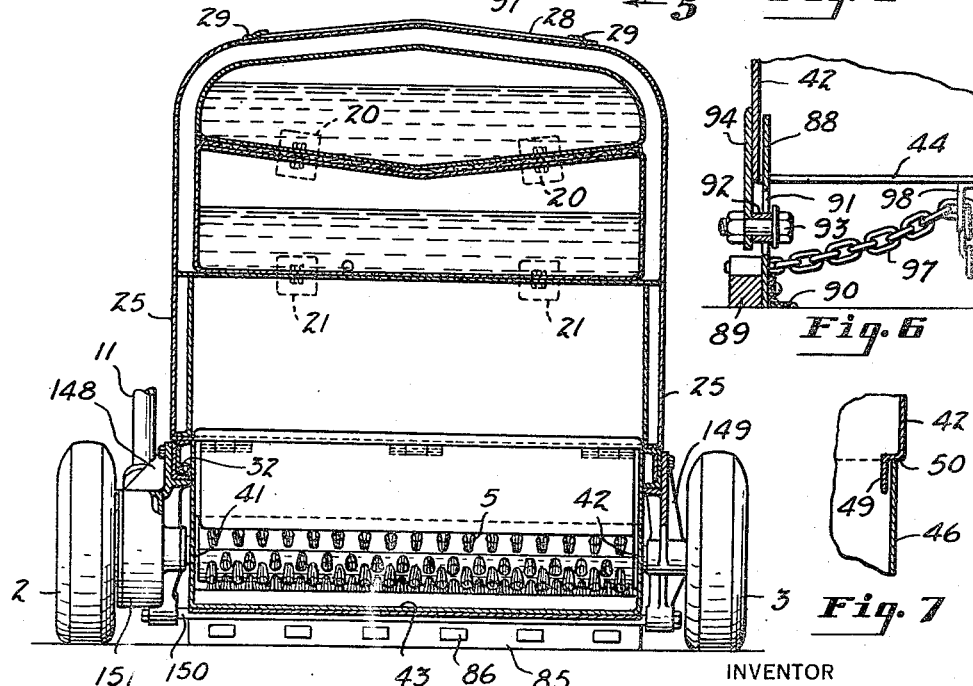

Oct. 27, 1942.   S. R. TEAGER   2,300,280
APPARATUS FOR SWEEPING
Filed Oct. 8, 1938   9 Sheets-Sheet 4
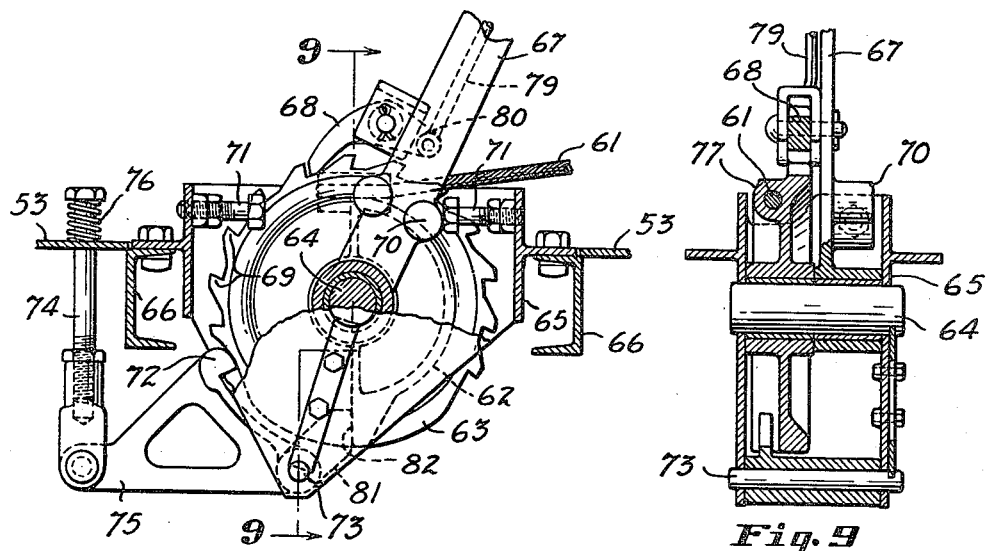
Fig. 8   Fig. 9
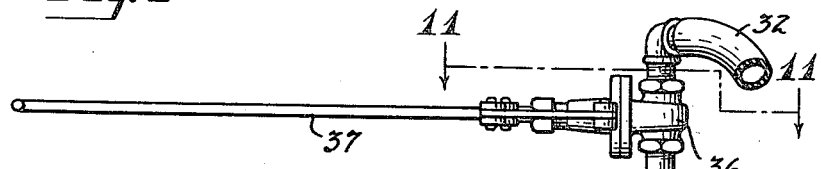
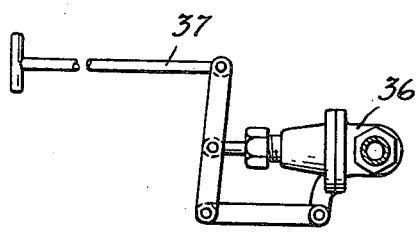
Fig. 11
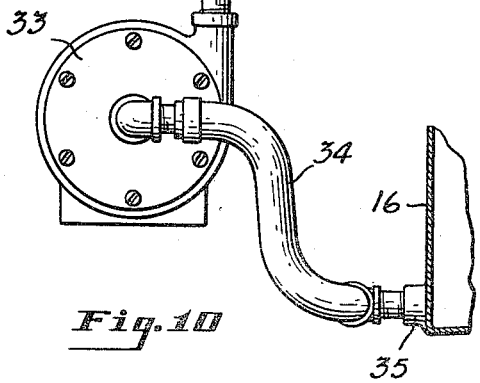
Fig. 10
INVENTOR
STEPHEN R. TEAGER
BY
Evans & McCoy
ATTORNEYS Oct. 27, 1942.  S. R. TEAGER  2,300,280
APPARATUS FOR SWEEPING
Filed Oct. 8, 1938  9 Sheets-Sheet 5
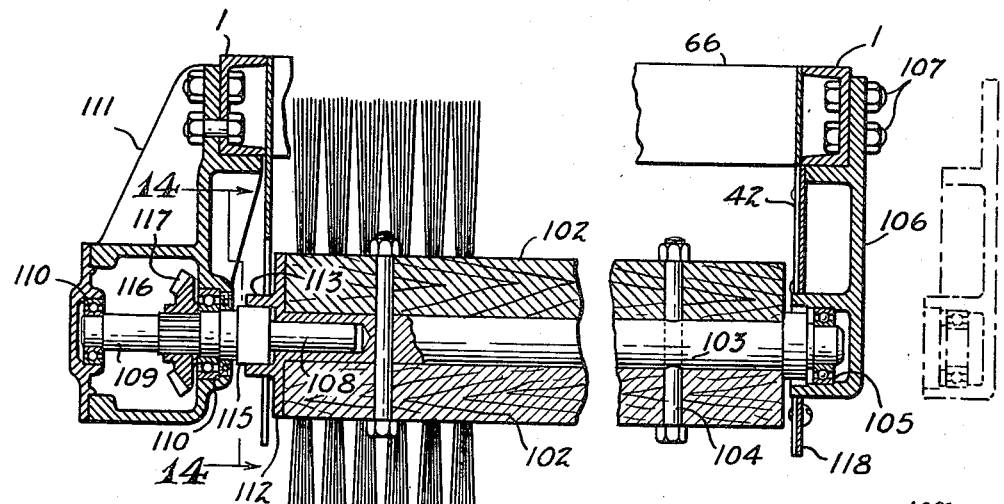
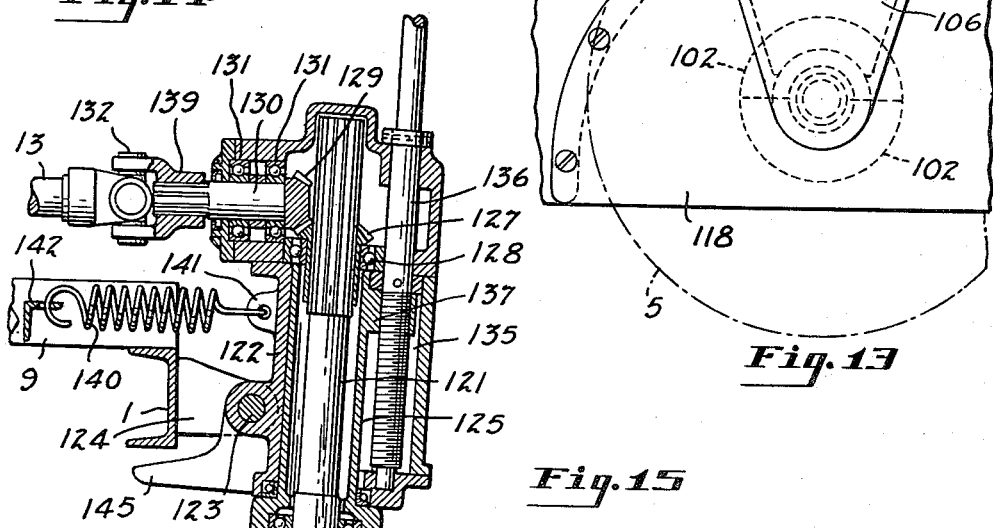
INVENTOR
STEPHEN R. TEAGER
BY
Evans & McCoy
ATTORNEYS Oct. 27, 1942.    S. R. TEAGER    2,300,280
APPARATUS FOR SWEEPING
Filed Oct. 8, 1938    9 Sheets-Sheet 6

INVENTOR
STEPHEN R. TEAGER
BY
Evans & McCoy
ATTORNEYS

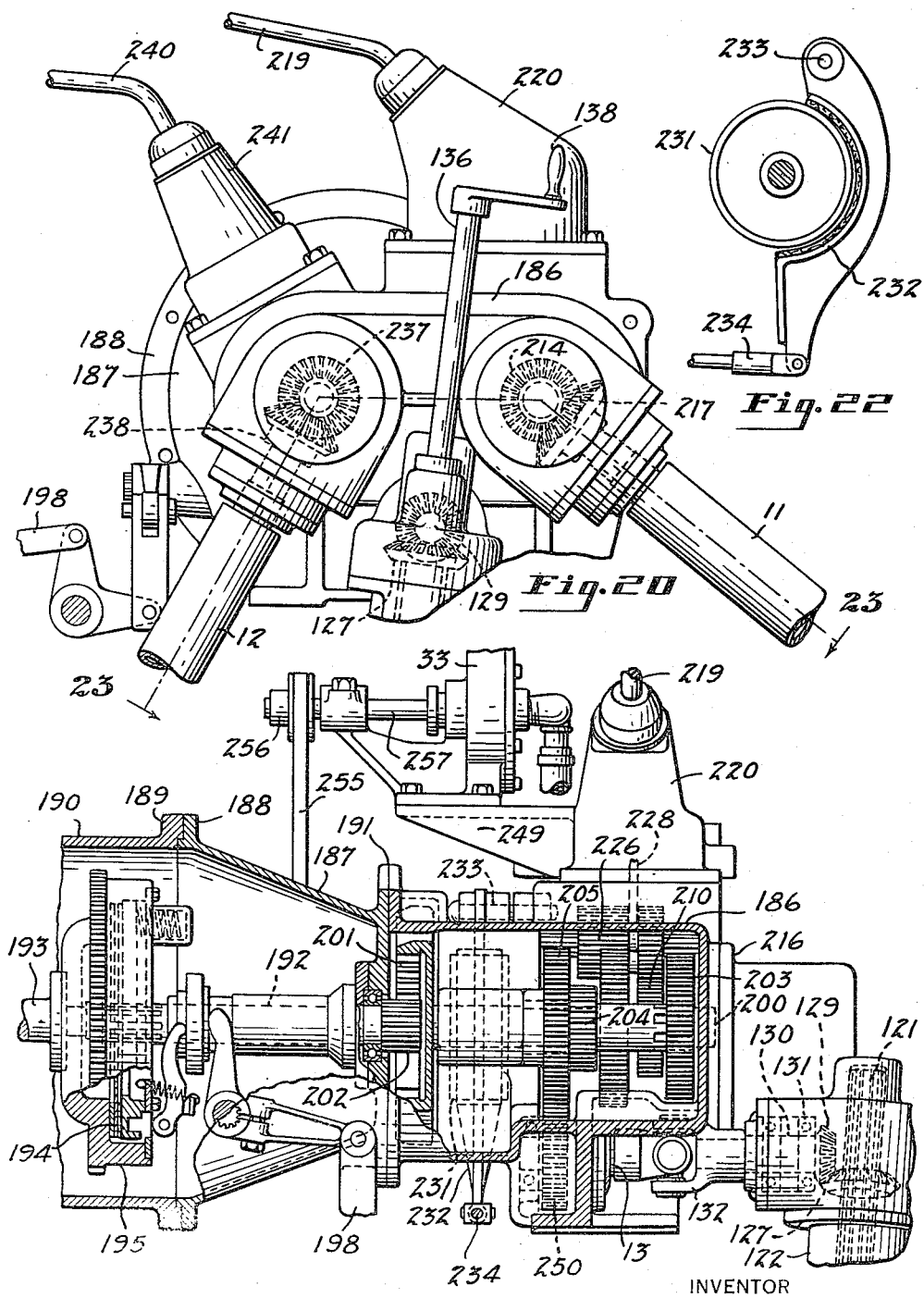

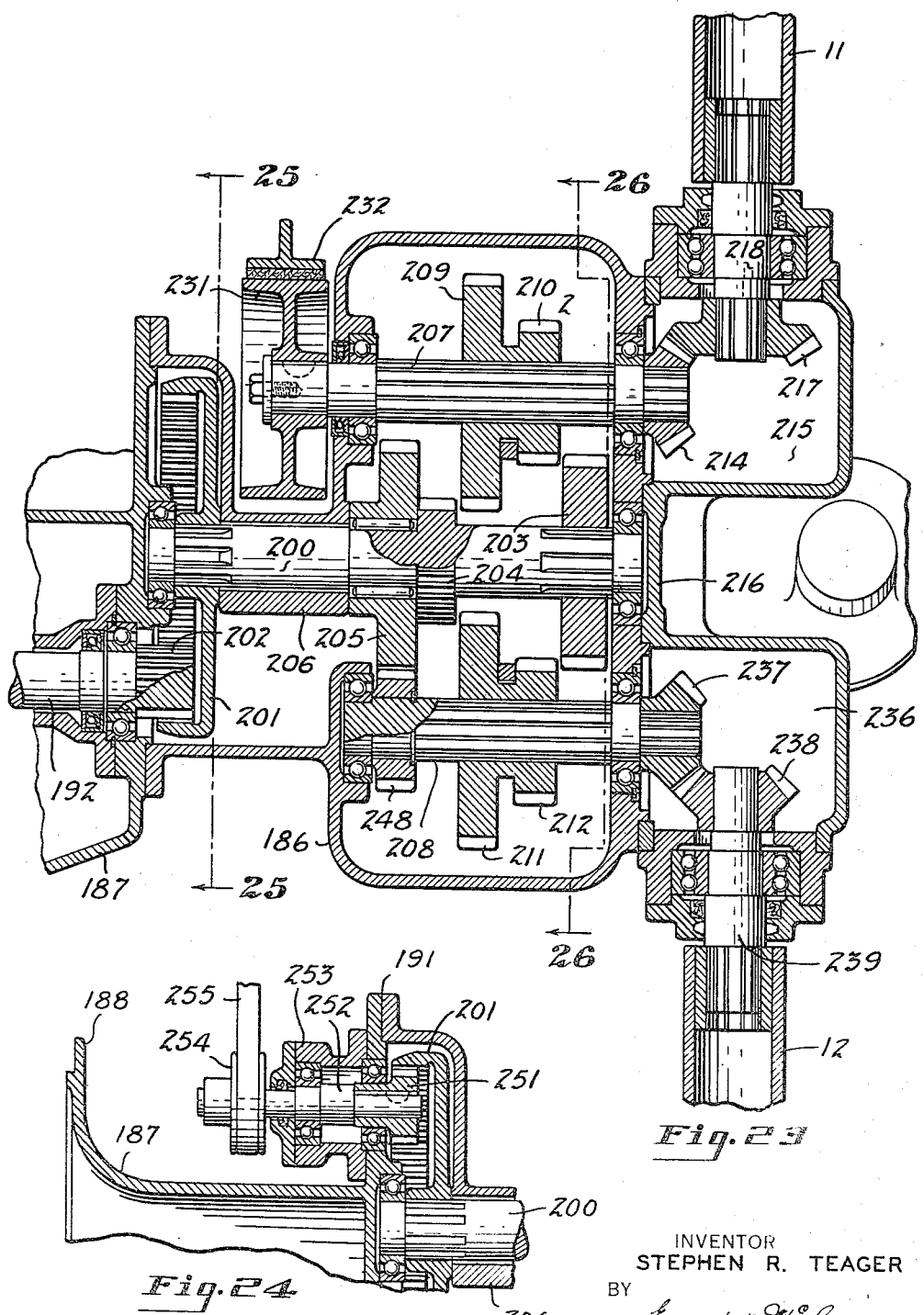

Oct. 27, 1942.    S. R. TEAGER    2,300,280
APPARATUS FOR SWEEPING
Filed Oct. 8, 1938    9 Sheets-Sheet 9

INVENTOR
STEPHEN R. TEAGER
BY
Evans & McCoy
ATTORNEYS

Patented Oct. 27, 1942

2,300,280

UNITED STATES PATENT OFFICE 2,300,280

APPARATUS FOR SWEEPING

Stephen R. Teager, Ravenna, Ohio, assignor to The Byers Machine Company, Ravenna, Ohio, a corporation Application October 8, 1938, Serial No. 233,985

8 Claims. (Cl. 15—82)

This invention relates to sweepers having drive means for actuating the broom or brooms and progressing the sweeper over the surface to be swept.

As previously constructed, sweepers for use on streets, sidewalks, and in buildings, have usually been either cumbersome and unwieldy machines of considerable size and weight, or relatively ineffective devices of small size and flimsy construction. Machines of the former type are difficult to handle and, in addition to having a high initial cost, their upkeep and maintenance is greater than desirable. The smaller, so called hand machines, have not been considered as sufficiently reliable for continued or steady service. This invention, therefore, has for its principal object the provision of a sweeper of relatively lightweight construction which is easy to handle and operate and which is improved in efficiency and sturdiness as well as in appearance. A sweeper embodying the invention exhibits improved operating characteristics and is adapted to sweep more quickly and efficiently than devices of the same character previously known.

The invention includes improvements in the driving mechanism wherein a single or unitary housing structure encloses a transmission for distributing power to the individual brooms as well as the traction assembly, such transmission being of improved character embodying means for individually changing speed for both the brooms and the traction and means for effecting a reverse drive of the traction.

The invention includes an improved method for handling the dirt being gathered by the sweeper so that the leaving of a track or trail of dirt behind the sweeper is minimized, and the dirt holding hopper is of improved construction so as to more efficiently retain dirt and rubbish deposited therein and to effect a more rapid and efficient release of the gathered debris when dumping the same.

Another and more specific object of the invention is to effect improvements in the construction and operation of a sweeper gutter broom, including means for raising or lowering the broom during operation of the same, and a spring pressed mounting for the broom to prevent injury to the latter when run against curbing. Additionally, the gutter broom is mounted and operated so as to effect more equal distribution of debris thereby, across the path of the main horizontal broom.

Another object of the invention is to effect improvements in the construction and operation of the main broom whereby the life of the broom is increased and the sweeping characteristics of the machine are enhanced. Such improvements include a micro adjustment for varying the pressure on the broom by which it is urged against the surface being swept, and the rotation of the broom at a critical speed so as to effect a proper distribution of the debris in the hopper of the sweeper.

Another object of the invention is to provide improvements in the equipment for storing and spraying water used to dampen or wet the surface being swept, particular use being made of the heat from the engine for driving the sweeper to maintain the spray water above freezing temperatures.

A further object of the invention is to provide a sweeper simple in design and construction and relatively inexpensive to manufacture, such sweeper having improved weight distribution with respect to the driving and steering wheels, and arranged for utilization of the pressure of exhaust gases for sweeping. Other objects and advantages will become apparent from the following detailed description of a suitable embodiment of the invention which is made in connection with the accompanying drawings, in which:

Fig. 1 is a side elevational view of the sweeper;

Fig. 2 is a plan view of the sweeper shown in Fig. 1;

Fig. 3 is a detail vertical section with parts removed, taken substantially on the line 3—3 of Fig. 2 and showing the brake and clutch actuating pedals;

Fig. 4 is a longitudinal vertical sectional view, with parts removed, showing the front end of the sweeper;

Fig. 5 is a transverse vertical sectional view of the sweeper with parts removed, taken substantially on the line 5—5 of Fig. 4;

Fig. 6 is a sectional detail showing the construction of the floating dust apron, and is taken substantially on the line 6—6 of Fig. 4, being enlarged with respect thereto;

Fig. 7 is a sectional detail taken substantially on the line 7—7 of Fig. 4 and enlarged with respect thereto;

Fig. 8 is a detail view, partly in section and with parts removed, showing the mechanism for raising and lowering the dirt hopper, taken substantially on the line 8—8 of Fig. 2, and enlarged with respect thereto;

Fig. 9 is a sectional view taken substantially on the line 9—9 of Fig. 8;

Fig. 10 is an elevational assembly detail of the water pump mechanism and control valve;

Fig. 11 is a plan view with parts removed taken substantially on line 11—11 of Fig. 10;

Fig. 12 is a longitudinal foreshortened sectional detail showing the main horizontal broom, being taken substantially on line 12—12 of Fig. 1;

Fig. 13 is an elevational detail showing the journal bracket for mounting the free end of the main broom;

Fig. 14 is a detail view showing the driven end of the main broom, and is taken substantially on the line 14—14 of Fig. 12;

Fig. 15 is a vertical sectional view, with parts removed, taken through the supporting and driving mechanisms of the gutter broom assembly;

Fig. 20 is an end elevational view, with parts removed, of the transmission and drive assembly;

Fig. 21 is a sectional view of the transmission, with parts removed, taken along a line paralleling the crank shaft of the drive engine;

Fig. 22 is a detail view of the brake;

Fig. 23 is a sectional view, with parts removed, through the transmission, and is taken substantially on the line 23—23 of Fig. 20;

Fig. 24 is a sectional detail showing the drive for the water pump and is taken substantially on the line 24—24 of Fig. 25;

Figure 17:
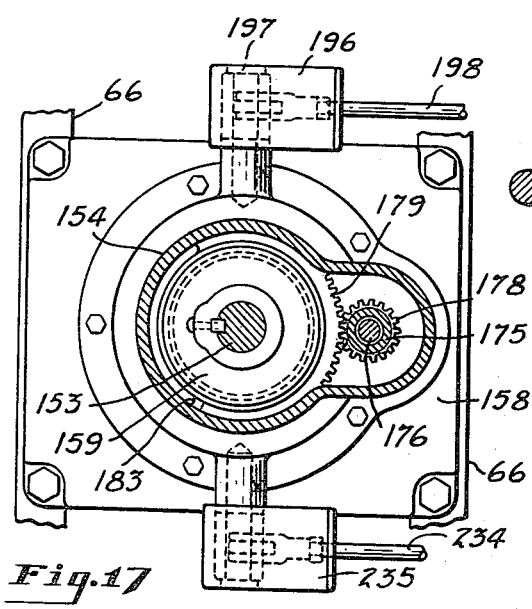
Fig. 17 is a horizontal sectional view, with parts removed, taken substantially on the line 17—17 of Fig. 16.
Figure 16:
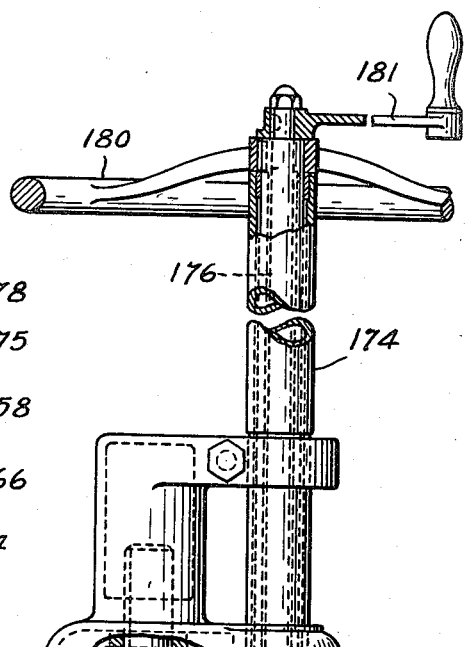
Fig. 16 is an elevational detail, partially in section and with parts removed, showing the construction of the steering and elevating mechanisms.

Referring to the accompanying drawings, in which like numerals refer to like parts throughout the several views, the sweeper illustrating the present invention has a frame 1, which may be formed of channel members secured together by any suitable means such as welding. This frame is mounted on front right and left wheels 2 and 3 respectively, the former of which serves to drive the vehicle, as will be later described, and a pair of dual rear wheels 4 which serve to steer the vehicle, as will also be later described. Carried beneath the frame 1, and disposed transversely of the machine, is a main broom 5 actuated for rotation in a counter-clockwise direction, as viewed in Fig. 4, about a substantially horizontal axis so as to throw dirt and debris from the surface being swept into a hopper 6 located in the front part of the machine between the wheels 2 and 3.

A gutter broom 7 is mounted at the right hand side of the frame 1 to the rear of the drive wheel 2 and slightly in advance of the main broom 5. The gutter broom is actuated for rotation in a counter-clockwise direction when viewed from above as in Fig. 2, so as to sweep dirt and debris out of a street gutter adjacent the curbing and deposit it in the path of the main broom 5.

The machine is driven by an internal combustion engine 8 of conventional construction which is disposed transversely across the machine above and slightly in advance of the main broom 5, being supported on cross members 9 secured to the frame 1.

A transmission 10, to be later described, is connected to the engine 8 and delivers power to the traction wheel 2, main broom 5, and gutter broom 7, through drive members or shafts 11, 12 and 13 respectively.

At the front of the sweeper above the hopper 6 is mounted a tank 16 for carrying water or other liquid to be used in sprinkling the surface to be swept. This tank is preferably centered over the front wheels 2 and 3 and rests on top panel 17 of the hopper 6, the latter being reinforced by cross members 18.

A fuel supply tank 19 is mounted in a cutaway portion of the water tank 16 at the rear thereof and is secured in place by tie plates 20, similar plates 21 being used to secure the water tank 16 to rear panel 22 of the hopper 6.

The engine, transmission and the fuel and water tanks are enclosed by a hood 23 which is secured to the frame 1 and forms front and side panels 24 and 25 respectively of the hopper 6.

As shown in Fig. 4, the hood 23 is separated at top, front and sides from the water tank 16 by a space 26 which is continuous with the enclosure for the engine 8. Thus the heat developed by the engine during operation is free to circulate about the water tank 16 in the space 26 so as to maintain the water above freezing temperature during cold weather. A capped inlet 27 for the water tank 16 extends through the top of the hood 23 at the front end of the latter to permit replenishing of the water supply in the tank 16. A sliding panel 28 carried in guides 29 normally closes an opening through the top rear of the hood 23 into the engine chamber, this panel being slidable to the front position or to the right, as viewed in Figs. 2 and 4, so as to permit access to the engine. At the left hand side of the hood 23 is an opening for a cooling radiator 30 of the engine 8, and at the front of the hood are hinged doors which are mounted over apertures in the portion of the hood 23 which forms the front panel portion 24 of hopper 6, so as to permit access to the hopper for cleaning.

Mounted transversely across the front of the vehicle is a spray pipe 31 connected by conduits 32 to the discharge of a rotary pump 33 of conventional construction which is mounted on the transmission 10. Conduit 34 connects the inlet of the pump 33 with outlet 35 at the bottom of the water tank 16.

A quick acting shut-off valve 36 is interposed in the conduit 32 leading to the spray pipe 31 and is actuated by a rod 37 which extends through dashboard 38 of the vehicle convenient to the operator for manipulation of the valve to control the flow of water to the spray pipe during operation of the sweeper.

The hopper 6 has bottom side panel members 41 and 42 secured to and suspended from the channel members which form frame 1 of the machine on the right and left hand sides of the sweeper respectively. The bottom edges of these panels carry bottom panel 43 of the hopper, which is disposed transversely across the sweeper between the wheels 2 and 3 and slopes downwardly towards the front of the machine. Rear edge 44 of the bottom panel 43 is disposed in substantially parallel relation with respect to the axis of rotation of the main broom 5 and separated from the periphery of the broom by a distance slightly in excess of the diameter of the broom as shown in Fig. 4. Preferably the rear edge 44 of the hopper bottom is located well below the center line of the main broom and is the highest part of the hopper bottom.

Across the bottom of the hopper at the front end thereof is mounted a movable trap or door 45 which has segmental end panels 46 pivoted at 47 to the frame 1. As shown in Fig. 4, the door 45 is cylindrically curved so that the door may be moved upwardly to a position such as that indicated by the broken lines of Fig. 4, to dump debris previously carried by the door out of the opening thereby created in the bottom of the hopper. Flange member 48 secured along the outside of the bottom edge of the door 45 is arranged to underlie the front edge of the hopper bottom 43 when the door is closed, so as to effect a seal between the door and the hopper bottom. The front upright edges of the bottom side panels 41 and 42 of the hopper are formed with offset flanges 49 which are disposed in overlying relation with the rearwardly directed edge portion of the segmental door ends 46 when the hopper door is closed, see Fig. 7. Shoulders 50 formed between the offset flanges 49 and side panels 41 and 42 serve as abutments for the edges of the door ends 46 when the door is closed.

The operator rides on a platform 53 supported by frame 1 at the rear of the machine. Preferably this platform is bounded or enclosed by an upright railing or apron 54, the front ends of which are formed upwardly to blend into the hood 23. A spring mounted seat 55 is supported on the platform 53 for the convenience of the operator.

A mechanism is provided for raising or lowering the hopper door 45 from the operator's station. This mechanism comprises a bell crank lever 56 mounted inside the hopper 6 and pivoted at 57 to the frame 1. One arm of the lever is pin connected by a link 58 to a pivot 59 secured to one of the segmental end panels 46, and the other arm of the bell crank lever extends upwardly and is pivotally connected to a clevis 60 secured on a cable 61 which extends rearwardly to a drum 62, formed on one side of a ratchet wheel 63 journaled on a shaft 64 mounted on housing 65 carried by frame cross members 66 adjacent the operator's station at the rear of the machine. A hand lever 67 is pivoted on the shaft 64 and extends upwardly therefrom for actuation by the operator. A spring pressed pawl 68 is pivotally carried at one side of the lever 67 and is engageable with teeth 69 formed on the periphery of the ratchet wheel 63. Contact pillows 70 are formed on the hand lever 67 and are engageable with adjustable stop bolts 71 secured in the housing 65 to limit the movement of the hand lever. A latch 72 is pivotally carried by a spindle 73 journaled in downwardly extending portions of housing 65, and is engageable with the teeth 69 of the ratchet wheel 63 to prevent clockwise movement of the latter, as viewed in Fig. 8. An adjustable link bolt 74 is pivotally connected to an extension 75 formed on the latch 72 and extends upwardly through the platform 53. A helical compression spring 76 is disposed between the head of the bolt 74 and the platform 53 to normally draw the bolt upwardly and pivot the latch 72 in a clockwise direction, as viewed in Fig. 8, to maintain the latter in engagement with the teeth 69 of the ratchet wheel 63. Upon movement of the hand lever 67 back and forth, the ratchet wheel 63 is rotated in a counter-clockwise direction, as viewed in Fig. 8, to draw the cable 61 toward the left, the latter being anchored in a boss 77 adjacent to drum 62. The cable 61 is thus wound about the drum, effecting a pivotal movement of the bell crank lever 56 in a counter-clockwise direction, as viewed in Fig. 4, to likewise pivot the hopper door 45 in a counter-clockwise direction to substantially the broken line position shown in Fig. 4.

When it is desired to close the hopper door, the pawl 68 is released by depressing a button 78 at the upper end of the hand lever 67, which acts through a rod 79 to depress an extension 80 on the pawl, according to well known practice. The operator then depresses the bolt 74 so as to release the latch 72, permitting the ratchet wheel 63 to rotate in a clockwise direction, as viewed in Figs. 4 and 8, under the influence of the cable 61 drawn by the weight of the hopper door 45. The limit of clockwise movement of the ratchet wheel is determined by a stop 81 which engages a shoulder 82 formed on one end of the drum 62. The stop 81 is integral with the latch 72 so as to pivot about the spindle 73. Thus the force of impact between the shoulder 82 and stop 81 is partially absorbed by the compression spring 76.

A flexible dust apron 85 is suspended beneath the bottom 43 of the hopper 6 and arranged so that its bottom edge normally contacts the surface being swept. This apron may be suitably constructed of one or more thicknesses of heavy canvas to which has been secured a number of metal weights 86. Preferably, the apron 85 is disposed at an angle with respect to the normal direction of movement of the sweeper, sloping forwardly from the left hand side of the vehicle towards the right hand or curb side. In such position the apron intercepts debris cast forward by the gutter broom 7 to prevent its being thrown beyond the range of the main broom 5, which then picks up the debris and throws it into the hopper 6.

As shown in Figs. 1 and 4, the bottom side panels 41 and 42 extend rearwardly beyond the main broom 5 and have their ends joined by a rear bottom panel 87 which is disposed across the rear side of the broom 5 below the frame 1. The bottom edges of the aprons 41, 42 and 87 are normally spaced from the surface over which the sweeper is progressed, and to prevent the throwing of debris beyond the left side of the vehicle, a floating or vertically movable brush shield 88 is arranged as an extension of the bottom side panel 42. This brush shield comprises a sheet or plate of metal which overlaps the bottom of the panel 42 and rides along the surface to be swept. It is provided along its bottom edge with a runner 89 which extends beyond the front end of the shield and is curved upwardly so that it rises over bumps and irregularities in the surface being swept. Desirably a flexible or rubber strip 90 is secured along the bottom edge of the shield 88 on the opposite side thereof from the runner 89 to provide a more effective seal between the shield and pavement when the latter is of an irregular character, such as paving blocks or bricks. At the front end of the shield 88 is a vertically elongated slit 91 which permits vertical movement of the shield relative to the panel 43 and receives a tubular bushing 92 secured by bolt 93 to a depending bracket 94 fastened to the outside of the panel 42 a short distance rearwardly of the rear edge 44 of the bottom panel 43. A chain 97 is connected to the front end of the runner 89 and extends diagonally upward to a bracket 98 secured to the underside of the bottom panel 43. This chain limits outward movement of the shield 88 when the sweeper is traveling on a curve to the right. A similar chain 99 connects the rear of the shield 88 to a bracket 100 secured to the frame 1 of the sweeper.

The main broom 5 is composed of bristles 101, Fig. 12, set in a pair of semi-cylindrical core members 102 which embrace a shaft 103 and are secured thereto by bolts 104. At the left hand side of the machine (to the right as viewed in Fig. 12) the shaft 103 is journaled in a ball-bearing assembly 105 carried in a bracket 106 secured to the frame 1 by bolts 107. The opposite end of the shaft 103 is received on quill 108 of a short shaft 109 journaled in roller bearings 110 carried by a bracket 111 secured to the frame 1.

The end of the shaft 103 which is received on the quill 108 has formed thereon a radially extending flange 112 which serves as an abutment for the brush halves 102. This flange has a hub 113 which is provided with a square opening 114 receivable on a squared portion 115 of the shaft 109 to establish a driving connection between the latter shaft and the brush or broom assembly.

The bracket 111 has a gear box or chamber 116 formed therein which receives the shaft 109. A beveled gear 117 is secured on the shaft 109 within the chamber 116 and is driven by a beveled gear secured on the end of the drive shaft 112 previously mentioned, thus actuating the broom 5 through the squared portion 115 of the shaft 109.

The shaft 103 has a sliding fit in the inner race of the bearing 105 so that the bracket 106 may be removed therefrom by releasing the bolts 107. Portion 118 of the bottom side panel 42 is removable to provide an opening in the panel which will permit endwise movement of the brush 5 so that the brush can be withdrawn from the quill 108 and from its position beneath the sweeper for repair or replacement. In replacing the broom or brush the flanged end of the shaft 103 is slid on to the quill 108 and the squared hub 113 fitted over the squared portion 115 of the shaft 109, after which the removable portion 118 of the panel 42 is replaced and the bracket 106 secured in place with the shaft 103 journaled in the bearing 105. In this manner the main brush of the sweeper can be quickly and easily removed from the machine and replaced by a new broom or brush, or repaired, according to needs. The main brooms of sweepers of this character are subjected to considerable wear so that it is of paramount importance that means be provided which will permit ready replacement of a worn broom. Accordingly, the present invention, which enables the broom to be easily removed and withdrawn from its position under the frame of the machine and subsequently replaced with a minimum of time and effort, is of pronounced importance.

The gutter broom 7 is secured on the lower end of an upright shaft 121 rotatably mounted within the housing 122 which is pivoted on a rod 123 carried by brackets 124 secured to the frame 1. A sleeve member 125 is slidingly mounted in the housing 122 for up and down movement and at its lower end carries a bearing assembly 126 which has a press fit with the shaft 121 adjacent the lower end of the latter, so that the shaft while being rotatably mounted within the sleeve member is moved vertically by the sleeve member in the housing 122. The upper end of the shaft 121 has splined thereon a bevel gear 127 journaled in a bearing 128 carried within the housing 122. The gear 127 is meshed with a bevel gear 129 secured on a short shaft 130 journaled by bearings 131 in the housing 122. The shaft 130 is connected by a universal 132 to the drive shaft 13, previously mentioned, so as to establish a driving connection between the gutter broom 7 and the transmission 10.

An upright shaft or rod 136 is journaled for rotation in a chamber 135 formed in one side of the housing 122. This rod is disposed on the outside of the sleeve member 125 and is held against longitudinal movement in the housing. A threaded portion of the rod engages a lateral extension 137 formed on the sleeve member 125. Accordingly, upon rotation of the shaft or rod 136 in one direction, the sleeve member 125 is forced out of the housing 122 so as to lower the gutter broom 7 and rotation of the shaft 136 in the opposite direction draws the sleeve member 125 into the housing so as to elevate the gutter broom 7. The shaft 136 is rotated by means of a crank 138 carried on its upper extremity and this rotation may be effected while the gutter broom is being rotated through the drive shaft 13 because of the splined connection between the gear 127 and the gutter broom shaft 121. This feature is of considerable advantage since it permits the operator of the sweeper to maintain the gutter broom in a proper sweeping position while the sweeper is being advanced over a street, thus lessening the time required for operation and eliminating the necessity for the operator to stop the vehicle and leave the operator's station in order to make adjustments in the position of the gutter broom.

The short shaft 130 has a splined connection 139 to the universal 132 which permits slight pivotal movement of the gutter broom housing 122 on the rod 123. A helical tension spring 140 is stretched between a boss 141 on the housing 122 and a bracket 142 secured between the motor supporting members 9. This spring normally draws the top of the housing 122 toward the frame of the machine to pivot the gutter broom assembly in a counter-clockwise direction about the rod 123, as viewed in Fig. 15. Adjustment of the parts is arranged so that the splined connection 139 arrests this pivotal movement when longitudinal axis 143 of the gutter broom shaft 121 is inclined from the vertical 144, inwardly from about 1½° to about 4½°, preferably about 3°. In the event that the driver of the sweeper runs too close to a curbing or other obstruction, the gutter broom assembly has a pivoting action about the rod 123 which is resisted by the spring 140, thus allowing a yielding movement of the broom which prevents injury to the mechanism. An arm 145 formed on the housing 122 is arranged to engage the frame 1 to prevent excessive pivoting movement of the gutter broom housing.

As shown in Fig. 1 the axis 143 of the gutter broom shaft is inclined rearwardly at the bottom from about 3° to about 9°, preferably in the neighborhood of about 6° from the vertical, which is again shown at 144. These angles of inclination of the gutter broom axis, have been found to give successful operating characteristics to the device. It is of major importance that the gutter broom so distribute the debris and dirt swept by it that when thrown by the main broom 5 into the hopper 6, the dirt is piled relatively evenly across the width of the hopper and is not primarily deposited at one side of the hopper. It has been found that in order to effect a uniform distribution of debris in the hopper, the broom 5 should be rotated from about 400 to about 500 revolutions per minute, preferably in the neighborhood of 450 R. P. M. and broom 7 should be rotated from about 250 to about 300 revolutions per minute, preferably in the neighborhood of 275 R. P. M. When operated at aforementioned speeds with gutter brush set so that its vertical axis is inclined rearwardly about 6° and inwardly about 3°, the brooms are found to distribute the dirt and debris evenly across the width of the hopper 6 and an extremely efficient and effective sweeping action results.

During operation the sweeper is advanced over the surface to be swept in a forward direction or to the right, as viewed in Figs. 1, 2, and 4, while the main broom 5 is rotated in a reverse direction or counter-clockwise as viewed in Figs. 1 and 4, and the gutter broom 7 is rotated in a counter-clockwise direction as viewed in Fig. 2 so as to cast dirt and debris from the surface being swept across the path of the main broom 5. Thus the main broom is progressed over the surface to be swept and casts debris from such surface upwardly and forwardly in an arcuate path ahead of the broom in the direction of the hopper 6. When the main broom is rotated at its critical speed of about 450 R. P. M., in the present instance, most of the debris is carried in an arcuate trajectory high enough and ahead of the broom a distance at least equal to the diameter of the broom, so as to clear the rear edge 44 of the hopper bottom 43 and deposit itself in the forward part of the hopper. Thus the hopper bottom 43 and trap door 45 intercept and collect the major portion of the cast debris. A relatively small portion of the debris cast ahead by the main broom 5 fails to clear the rear edge 44 of the hopper and falls to the surface being swept, from which it is again swept or cast upwardly and forwardly by the broom until finally it is deposited in the hopper.

This method of operating a sweeper is to be differentiated from previous methods in which the dirt hopper was located relatively close to the main broom. Where the hopper is relatively close to the broom it has been found that dirt is apt to escape from the hopper and be intercepted by the rotating brush before falling to the surface being swept, so that the debris is carried over the top of the brush and deposited in a trail behind the sweeper.

According to the method of the present invention, the rear edge of the hopper is sufficiently in advance of the broom or brush so that such debris as escapes from the hopper has ample time in which to fall to the surface being swept before the approach of the brush, thus enabling the brush to again cast the fallen debris upwardly and forwardly into the hopper. Furthermore, such dirt and debris as is deposited in the hopper tends to move forwardly as there is a slight shaking or agitation thereof occasioned by the movement of the sweeper. It is believed that this forward movement of the debris in the hopper is facilitated by the downward slope of the hopper bottom toward the front of the machine.

The wheels 2 and 3 are carried by short shafts mounted in brackets 148 and 149 respectively, which are secured to and dependent from the sweeper frame 1. A tie rod 150 underlies the bottom 43 of the hopper 6 and has its extremities secured to the lower portions of the brackets 148 and 149 to brace the brackets against lateral deflection.

The wheel 2 is driven by drive shaft 11, previously mentioned, through a bevel and ring gear (not shown) mounted in housing or gear box 151 formed as part of the bracket 148.

As shown in Fig. 1, the main broom 5 is rigidly carried with respect to frame 1 by means of the supporting brackets 106 and 111, previously mentioned, at a position intermediate the front wheels 2 and 3 and rear wheels 4. While sweeping it is important that the broom 5 bear against the surface to be swept with a correct amount of pressure so that the individual bristles 101 have a suitable brushing action over the surface. In the present machine this is effected by adjusting the height of the frame 1 with respect to the surface being swept, such adjustment being controlled through the rear or steering wheels 4. While a single rear wheel may be employed, it is preferable that a pair of such wheels be used in order to provide better support for the weight of the vehicle. These wheels are journaled on the ends of a cross-axle 152 secured at its center to the bottom of an upright post member 153 which extends in a vertical direction through the rear platform 53 and is carried within a housing 154 secured to the frame of the vehicle.

The post 153 extends axially through an externally threaded riser sleeve 155, which is received within an internally threaded adjusting sleeve 156 journaled in a cylindrical bore 157 formed in a base member 158 which underlies the housing 154. The upper end of the post 153 is carried by a cup-like internal housing 159 which is directed downwardly so that the large end thereof is received above the upper end of the riser sleeve 155 and embraces the upper end of the adjusting sleeve 156 at 160 for rotative sliding engagement therewith. A radially directed gear 161 is formed externally of the sleeve 156 and has an annular bottom surface which is circumferentially engaged by a circular shoulder on the base 158 adjacent the bore 157 and an annular top surface circumferentially engaged by the circular bottom end of the internal housing 159. Thus the sleeve 156 is confined by means of the gear 161 between the base 158 and internal housing 159 and prevented from axial movement. The upper end of the internal housing 159 bears against a thrust bearing 162 which encircles the upper end of the post 153 and seats against a pad formed across the inside of the housing 154, such pad being apertured to receive the upper end of the post 153 for vertical movement therethrough.

The riser sleeve 155 is counter-bored at 163 to receive a helical compression spring 164 which is confined between the inner end of the counter-bore and a circular collar 165 secured on the post 153 and arranged to ride within the counter-bore 163. Thus the post 153, supported by the wheels 4, resiliently carries the rear end of the sweeper, the post sliding in the upper end of the internal housing 159 and the riser sleeve 155 as the spring 164 is compressed or expanded.

Figure 19:
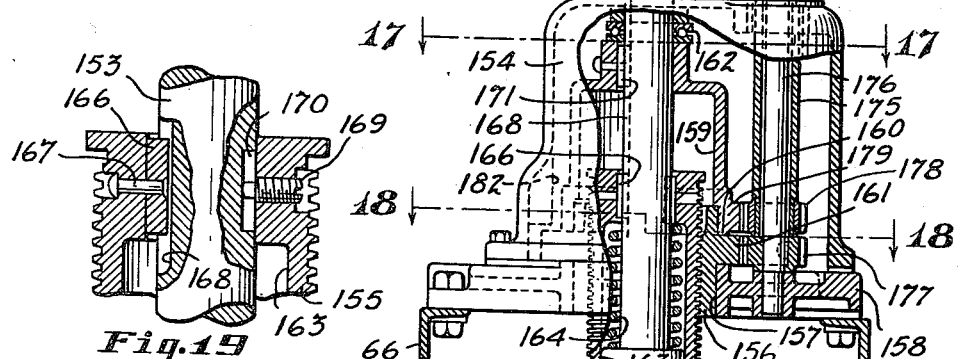
Fig. 19 is a detail view, partly in section, showing a fragment of the mounting for the steering wheel post illustrated in Fig. 16 and enlarged with respect thereto.
Figure 18:
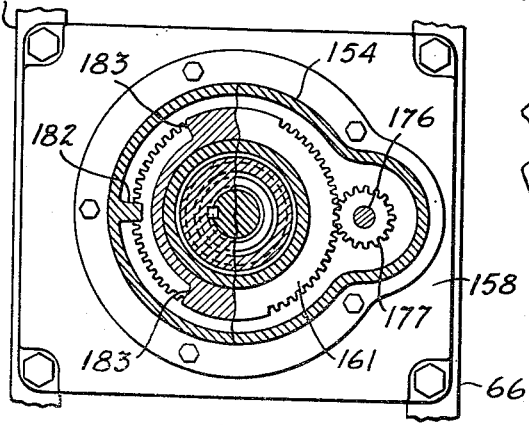
Fig. 18 is a horizontal sectional view, with parts removed, taken substantially on the line 18—18 of Fig. 16.
Figure 25:
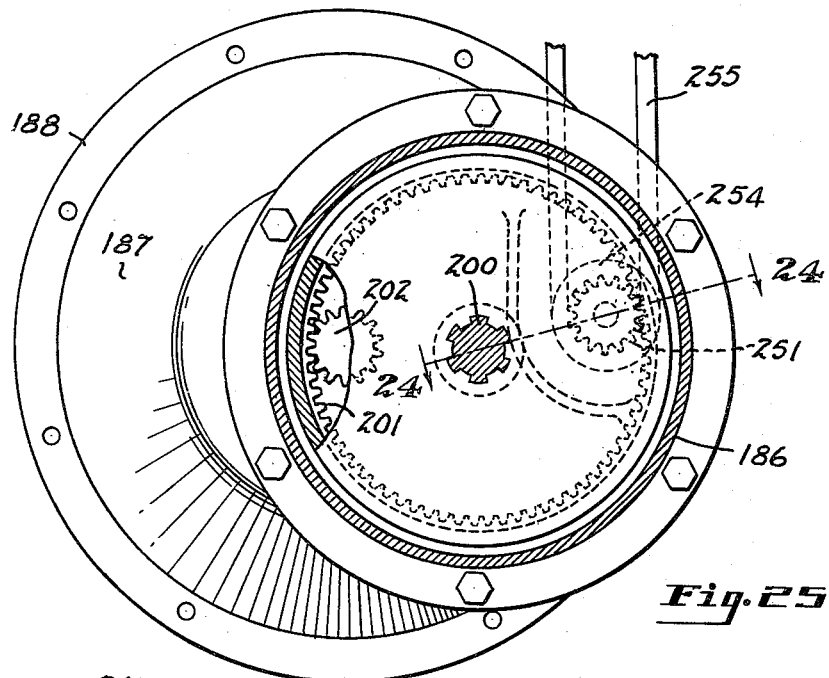
Fig. 25 is a transverse sectional view, with parts removed, taken substantially on the line 25—25 of Fig. 23.

The sleeve 155 is held against rotation on the post 153 by means of a key 166, Fig. 19, secured by a pin 167 within a groove formed in the sleeve and slidable in a keyway 168 formed longitudinally in the post 153. Opposite the key 166 is a radially disposed set screw 169 secured in the sleeve 155 and having an inner end receivable within an axial groove 170 formed in the post 153. The length of the groove 170 is substantially equivalent to the desired vertical movement of the post 153 with respect to the sleeve 155 as controlled by the spring 164, the pin 169 being provided to prevent the post 153 from dropping out of the steering assembly unit in the event the rear of the sweeper frame is elevated. By means of a key 171 secured in the upper end of the internal housing 159 and engageable in the keyway 168, the internal housing 159 is prevented from rotating with respect to the rod or post 153 so that the sleeve 155, internal housing 159, and rod 153 rotate as a unit.

Secured to the top of the housing 154 and extending upwardly therefrom in parallel relation with respect to the axis of the rod 153 is a tubular steering post 174 in which is journaled a tubular steering sleeve 175 and a height adjusting rod 176, the latter being disposed internally of the sleeve 175. The lower end of the rod 176 is journaled in the base member 158 and has secured thereon a pinion gear 177 which meshes with the gear 161. The lower end of the steering sleeve 175 has secured thereon a pinion gear 178 which meshes with a gear segment 179 formed about the lower periphery of the internal housing 159. The upper end of the steering sleeve 175 has secured thereon a steering wheel 180, of conventional construction, which is surmounted by a hand lever or crank 181 secured to a projecting end of the rod 176.

By rotation of the steering wheel 180, which turns the steering sleeve 175, the gear 178 rotates the internal housing 159 by means of the gear segment 179, thus turning the post 153 and the wheels 4. In this manner the direction of the movement of the vehicle is controlled by the rear wheels, permitting the rear end of the hopper to be swung either toward or away from a curb, as desired, so as to quickly and easily locate the gutter broom 7 in the most effective sweeping position. In order to eliminate the turning movement of the internal housing 159 and post 153, an abutment 182 is formed on the inside of the housing 154 and arranged to engage ends 183 of the gear segment 179.

By rotating the gear 177 through rod 176 and crank 181, the height adjusting sleeve 166 is rotated with respect to the threaded sleeve 155, the latter being prevented from rotation by means of the keys 166, 167 and gear 178, it being understood that the operator holds the wheel 180 against rotation when he desires to raise or lower the frame of the vehicle. Thus, a very fine or micro height adjustment for the vehicle frame is provided, and the pressure with which the main broom 5 is forced or held against the surface to be swept can be accurately controlled and varied by small increments.

As previously mentioned, the drive for the various parts or instrumentalities of the sweeper is by means of an internal combustion engine 8 through a single transmission 10. This transmission comprises main housings 186 and 187, the latter being somewhat bell-shaped and terminating at its large end in a radial flange 188 secured to a circumferential flange 189 formed on fly wheel housing 190 of the engine 8. A flanged joint 191 connects the housing 186 and 187. A main power take-off shaft 192 is journaled in the housing 187 and connected to crank shaft 193 of the engine by means of a spring loaded clutch indicated generally by the numeral 194, which is associated with fly wheel 195 of the engine and may be of conventional construction. The clutch is actuated by means of a pedal 196, Fig. 17, pivoted on a stud 197 secured in a boss formed on the steering post housing 154. The pedal 196 is connected to the clutch mechanism through a conventional rod and lever linkage indicated at 198.

Within the housing 186 is journaled main shaft 200 disposed in parallel relation with respect to the main power take-off shaft 192 but in offset relation with respect thereto, see Fig. 23. The end of this shaft 200 toward the housing 187 has secured thereon an internal ring gear 201 which is engaged by a pinion 202 secured on the shaft 192. At the end of the shaft 200 opposite the ring gear 201, is secured a spur gear 203, and on an intermediate portion of the shaft 200 is formed a spur gear 204 of less diameter than the gear 203. Adjacent the spur gear 204 is a gear 205 which is rotatably mounted on the shaft 200 and confined against longitudinal movement by the gear 204 and a guide portion 206 formed in the housing 186 to carry the shaft 200. Spaced above and to each side of the shaft 200 are parallel splined shafts 207 and 208 which are journaled in the housing 186 parallel to the main shaft 200. The splined shaft 207 carries double gear 209—210 which is longitudinally slideable thereon but held against rotation by the splines. The shaft 208 carries double gear 211—212 which is longitudinally slidable thereon but also held against rotation by the splines.

The drive for the traction is effected through the splined shaft 207 which carries a bevel gear 214 on an end thereof which projects through the housing 186 and is received within a gear chamber 215 of a cover housing 216 secured on the end of the housing 186 opposite the housing 187. The bevel gear 214 meshes with bevel gear 217 secured to a short shaft 218 journaled in the cover housing 216 and having a splined connection (Fig. 23) to the tubular drive member 11 leading to the gear box 151 of the drive wheel 2. This spline means connection provides for slight movement of the traction means or wheel 2 along the rotational axis of the rotatable member 11 during travel of the sweeper over rough terrain, thus reducing wear of the bearings and gears of the drive mechanism and avoiding breakage of the parts. The position of the double gear 209—210 for the traction drive is controlled by means of a conventional shift lever 219 carried by a transmission cap 220 secured on the top of the housing 186. The shift lever 219 extends rearwardly from the transmission, under the dashboard 38 and terminates in a ball 221 convenient to the operator. End 222 of the shift lever 219, which is disposed within the cap 220, engages a shifting dog 223 carried by a rod 224 in the usual manner. A depending yoke 225, formed on the dog 223, engages between the individual gears of the double gear 209—210. Upon manipulation of the gear shift lever 219 in accordance with standard practice so as to move the double gear 209—210 to the left as viewed in Fig. 23, the relatively small drive gear 204 meshes with the larger gear 209 of the double gear so as to rotate the splined shaft 207 at a relatively low rate of speed, which is transmitted to the traction wheel 2 through the gears 214, 217, and drive member 11. Manipulation of the shift lever 219 so as to mesh the smaller gear 210 of the double gear with the relatively large gear 203 effects a drive of the splined shaft 207 at a relatively high rate of speed so as to drive the traction wheel 2 in a forward direction at a relatively high rate of speed, through the gearing and drive shaft previously mentioned.

Figure 26:
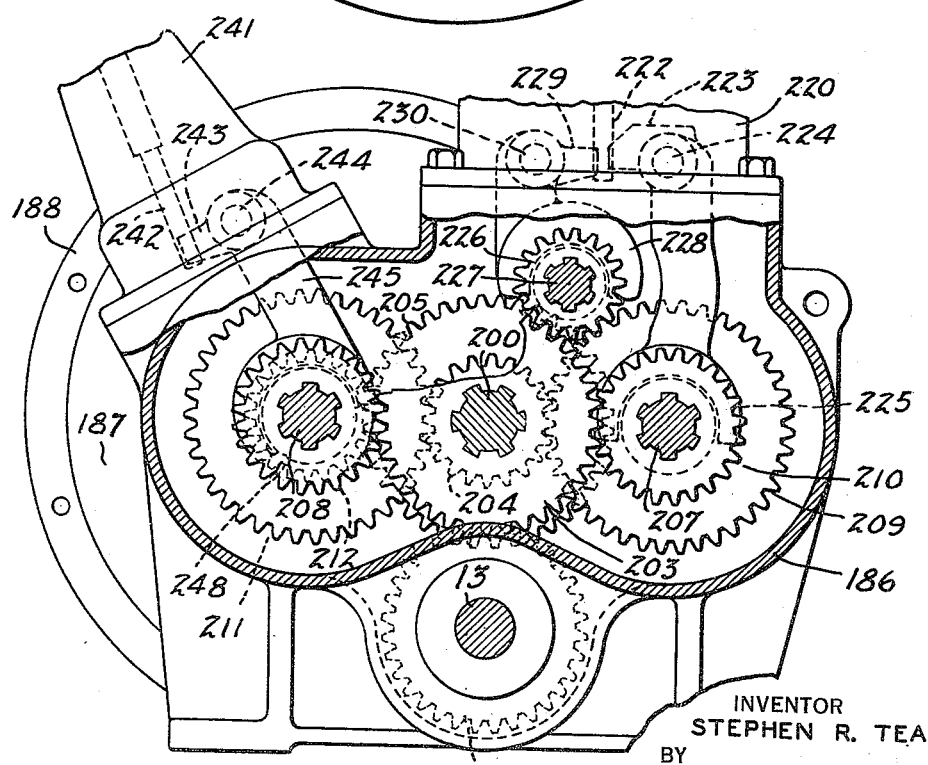
Fig. 26 is a transverse sectional view, with parts removed, taken substantially on the line 26—26 of Fig. 23.

To effect reverse drive of the traction wheel 2, a reverse gear 226 (Figs. 21 and 26) is mounted on a shaft 227 journalled in the housing 186 above and parallel to the main shaft 200 and the splined shaft 207. A yoke 228 extends from a dog 229 carried on a rod 230 and is responsive to movement of the end 222 of the shift lever 219 to slide the gear 226 on the shaft 227. As shown in Fig. 21, the yoke 228 rides in a circumferential groove formed in the gear 226 and one portion of this gear remains in constant mesh with the gear 209. Another portion of the gear 226 may be moved into or out of engagement with the spur gear 203 by means of the shift lever 219. When the drive is through the gear 226, the shaft 207 is driven in a reverse direction so that drive wheel 2 is likewise actuated in a reverse direction.

The end of the splined shaft 207 opposite the bevel gear 214 extends exteriorly of the housing 186 and has secured thereon a brake drum or wheel 231. A brake shoe 232, Fig. 22, is pivoted at 233 to a stud secured in the housing 186 and is connected by linkage 234 to a brake pedal 235 pivoted on a stud secured in a boss formed on the steering and elevating housing 154. This brake may be applied to arrest the movement of the vehicle and, as will later appear, may also be applied to arrest the rotation of the brooms 5 and 7.

The splined shaft 208 projects into a chamber 236 formed in the cover housing 216 and has secured thereon a bevel gear 237 which meshes with a bevel gear 238 secured on a short shaft 239 journaled in the cover housing 216 and having a splined connection (Fig. 23) with the tubular drive member 12 leading to the main broom 5. This spline means connection provides for slight movement of the main broom 5 along the rotational axis of the rotatable member 12 during travel of the sweeper over rough terrain, thus reducing wear of the bearings and gears of the drive mechanism and avoiding breakage of the parts. The double gear 211—212 is moved longitudinally on the splined shaft 208 by means of a shift lever 240 carried in a cap member 241 secured to the top of the housing 186. Lower end 242 of the shift lever 240 engages a dog 243 slidably on a shaft 244 mounted in the cap 241. The dog 243 has a depending yoke 245 which engages the double gear on the splined shaft 208 between the portions 211 and 212. When the shift lever 240 is manipulated so as to move the double gear to the right, as viewed in Fig. 23, so that the relatively small gear portion 212 thereof engages the relatively large spur gear 203, the shaft 208 is driven at a relatively high rate of speed so that the main broom 5 is likewise rotated at a relatively high rate of speed through the bevel gears 237 and 238 and the tubular drive member 12. Upon movement of the double gear to the left, as viewed in Fig. 23, so that the relatively large diameter gear 211 thereof engages the relatively small spur gear 204 on the shaft 200, the shaft 208 is driven at a relatively low rate of speed. Thus the main broom 5 may be driven at a relatively slow rate of speed.

A spur gear 248 is secured on the splined shaft 208 and meshes with the gear 205, which, as previously mentioned, is free running on the main shaft 200. Beneath the main shaft 200 and in parallel relation therewith is the gutter broom drive shaft 13 previously mentioned, Figs. 21 and 26. This shaft is journaled in a depending portion of the housing 186. A gear 250 secured on the shaft 13 meshes with the free running gear 205 to be driven thereby when the latter is actuated by means of the gear 248 on the splined shaft 208. Thus the gutter broom 7 is driven through the gears 248, 205 and 250, and the universal 132, and shafts 130 and 121, previously described, in synchronism with the main broom 5 so that the two brooms can more effectively cooperate with one another to produce an efficient sweeping action. When both the double gear 209—210 and the double gear 211—212 are intermeshed with the gears on the main shaft 200, it is apparent that the brake 232 is effected to control or retard the rotation of the brooms as well as that of the traction wheel 2.

The pump 33 previously described is mounted, as shown in Fig. 21, on a pad or bracket 249 formed as a lateral extension of the transmission cap 220. The drive for the pump 33 is effected by means of a spur gear 251 which meshes with the ring gear 201 and is secured on a short shaft 252 which is journaled in a housing 253 secured to a flanged end portion of the housing 187. Sheave 254 secured on a projecting end portion of the shaft 252 carries a belt 255 which drives a similar sheave 256 secured on pump shaft 257.

The present invention thus is seen to provide an improved sweeper which is capable of more effectively and efficiently sweeping a road or floor surface and is provided with a power unit which includes a single transmission from which all of the power for actuating the several brooms and traction is derived, as well as the power for actuating the sprinkling water pump. Additionally, means is provided for braking the vehicle alone, or both the vehicle and the brooms simultaneously. The feature of being able to brake the brooms and quickly arrest the rotation thereof is often of considerable advantage when material such as rope or cord becomes entangled in the bristles.

The arrangement of the parts of the sweeper is such that the greater portion of the weight is in advance of the main broom, while the operator's station is behind the broom so that he may more efficiently observe the sweeping action of the apparatus to control its direction. The spray water tank 16 is disposed substantially directly above the front wheels 2 and 3 so that regardless of the quantity of water in the spray tank, the pressure on the broom 5 remains substantially constant, since the weight of the water tank is borne substantially entirely by the front wheels. Similarly, the dirt hopper 6 is located so that the load contained therein is borne substantially entirely by the front wheels 2 and 3.

As shown in Fig. 1, exhaust pipe 258 from the internal combustion engine 8 is carried down the outside of the frame 1 and bottom side panel 41 and has its outlet end 259 directed forwardly between the main broom 5 and gutter broom 7 and against the surface being swept. In this manner the blast or force of exhaust gases discharged from the internal combustion engine is directed so as to prevent the formation of a dirt streak between the two brooms, which often occurred in previous sweepers because of the inability of the gutter broom to throw all of the dirt over which it rides into the path of the main broom 5.

Other modes of utilizing the principles of the present invention may be resorted to, change being made in the particular details of design and construction shown, as desired. Numerous modifications and alterations are contemplated and included within the scope of the invention, it being understood that the embodiment shown in the drawings and described above is given for purposes of explanation and illustration.

What I claim is:

1. In a sweeper having a frame and traction means for supporting and moving the sweeper over a surface to be swept, a power unit comprising an engine and a transmission disposed in alignment across the width of the frame so that the engine is adjacent one side of the sweeper and the transmission is adjacent the other side of the sweeper, said transmission including a housing structure secured to the frame and enclosing a plurality of parallel shaft means journalled on the housing structure and extending transverse to the normal direction of sweeper travel, said shaft means each having an end disposed through one end of the housing and projecting beyond the frame at said other side of the sweeper, means drivingly connecting the engine and the several shaft means including clutch means and speed changing means, rotary brush means carried by the frame, elongated rotary drive members connecting the projecting shaft means separately to the traction means and to the brush means for actuating the same, said drive members each being disposed at approximately a right angle to the shaft means connected thereto, and control means for the speed changing means extending through and supported by the housing structure.

2. In a sweeper, a frame, traction means for supporting and moving the sweeper over a surface to be swept, a rotatable brush and means supporting the same on the frame to engage such surface, an engine on the frame, and power transmission means having driving connection with the engine, said transmission means comprising a housing secured to the frame and supported thereby, a main shaft journaled in and supported by the housing and connected to the engine to be rotated thereby, first and second auxiliary shafts journaled in and supported by the housing in parallel relation to the main shaft, rotatable drive members having driving connection with the auxiliary shafts and connected to the traction means and to the brush respectively, gear means on the main shaft, gears keyed on the auxiliary shafts and slidable therealong for movement into and out of engagement with the gear means, and operating devices extending through the housing and having connection with the gears, said devices being shiftable to selectively move the gears into engagement with said gear means to drivingly connect either the traction means or the brush or both to the main shaft and engine.

3. In a sweeper, a frame, traction means for supporting and moving the sweeper over a surface to be swept, a rotatable brush and means supporting the same on the frame to engage such surface, means carried by the frame for spraying the surface before the same is brushed, an engine on the frame, power transmission means comprising a housing secured to the frame and supported thereby, a main shaft journaled in and supported by the housing and having connection with the engine to be rotated thereby, said connection including a clutch, auxiliary shafts journaled in and supported by the housing, rotatable members connecting the traction means and the brush to different auxiliary shafts, a pump for supplying liquid under pressure to the spraying means, means drivingly connecting the pump to the main shaft to be actuated thereby, movable gear means on the auxiliary shafts for selectively connecting either the traction means or the brush or both to the main shaft to be driven thereby, and means extending through the housing and shiftable to move said gear means on the auxiliary shafts.

4. In a sweeper, a frame, traction means for supporting and moving the sweeper over a surface to be swept, a cylinder brush and means supporting the same on the frame for rotation about a substantially horizontal axis, a gutter brush and means supporting the same on the frame for rotation about an upright axis, an engine on the frame, and power transmission means having driving connection with the engine, said transmission means comprising a housing secured to the frame and supported thereby, a main shaft journaled in and supported by the housing and connected to the engine to be rotated thereby, auxiliary shafts journaled in and supported by the housing and having gear means connecting the same to the main shaft, and rotatable members connecting the several auxiliary shafts respectively to the traction means, the cylinder brush and the gutter brush, said rotatable members each being disposed at an angle to the auxiliary shaft to which the same is connected.

5. In a sweeper, a frame, traction means for supporting and moving the sweeper over a surface to be swept, a cylinder brush and means supporting the same on the frame for rotation about a substantially horizontal axis, a gutter brush and means supporting the same on the frame for rotation about an upright axis, an engine on the frame, and power transmission means having driving connection with the engine, said transmission means having driving connection with the engine, said transmission means comprising a housing secured to the frame and supported thereby, a main shaft journaled in and supported by the housing and connected to the engine to be rotated thereby, auxiliary shafts journaled in and supported by the housing and having gear means connecting the same to the main shaft, and rotatable members connecting the several auxiliary shafts respectively to the traction means, the cylinder brush and the gutter brush, said rotatable members each being disposed at an angle to the auxiliary shaft to which the same is connected, and some of the connections of the rotatable members with the auxiliary shafts and with the traction means and the brushes including spline means to provide for slight movement of the traction means and brushes along the rotational axes of the rotatable members.

6. In a sweeper, a frame, traction means for supporting and moving the sweeper over a surface to be swept, a cylinder brush and means supporting the same on the frame for rotation about a substantially horizontal axis, a gutter brush and means supporting the same on the frame for rotation about an upright axis, an engine on the frame, and power transmission means having driving connection with the engine, said transmission means comprising a housing secured to the frame and supported thereby, a main shaft journaled in and supported by the housing and connected to the engine to be rotated thereby, first and second auxiliary shafts journaled in and supported by the housing and each having gear means for connecting the same to the main shaft to be actuated thereby, a third auxiliary shaft journaled in and supported by the housing and drivingly connected to the second auxiliary shaft to be actuated thereby, rotatable shaft members individually connecting the traction means and the brushes to the auxiliary shafts, the connections between the shaft members and the auxiliary shafts including gear means, and means extending through the housing and operable externally thereof to disconnect the gear means connecting the auxiliary shafts to the main shaft.

7. In a sweeper, a frame, traction means for supporting and moving the sweeper over a surface to be swept, a cylinder brush and means supporting the same on the frame for rotation about a substantially horizontal axis, a gutter brush and means supporting the same on the frame for rotation about an upright axis, an engine on the frame, and power transmission means having driving connection with the engine, said transmission means comprising a housing secured to the frame and supported thereby, a main shaft journaled in and supported by the housing and connected to the engine to be rotated thereby, first and second auxiliary shafts journaled in and supported by the housing and each having gear means for connecting the same to the main shaft to be actuated thereby, a third auxiliary shaft journaled in and supported by the housing and drivingly connected to the second auxiliary shaft to be actuated thereby, rotatable shaft members individually connecting the traction means and the brushes to the auxiliary shafts, the connections between the shaft members and the auxiliary shafts including gear means, means extending through the housing and operable externally thereof to disconnect the gear means connecting the auxiliary shafts to the main shaft, and said driving connection including a friction clutch to connect and disconnect the main shaft whereby the traction means and brushes can be simultaneously started and stopped while the engine is running.

8. In a sweeper, a frame, traction means for supporting and moving the sweeper over a surface to be swept, a cylinder brush and means supporting the same on the frame for rotation about a substantially horizontal axis, a gutter brush and means supporting the same on the frame for rotation about an upright axis, an engine on the frame, and power transmission means having driving connection with the engine, said transmission means comprising a housing secured to the frame and supported thereby, a main shaft journaled in and supported by the housing and connected to the engine to be rotated thereby, first and second auxiliary shafts journaled in and supported by the housing and each having gear means for connecting the same to the main shaft to be actuated thereby, a third auxiliary shaft journaled in and supported by the housing and drivingly connected to the second auxiliary shaft to be actuated thereby, rotatable shaft members individually connecting the traction means and the brushes to the auxiliary shafts, the connections between the shaft members and the auxiliary shafts including gear means, the cylinder brush being connected to the second auxiliary shaft and the gutter brush being connected to the third auxiliary shaft, a first gear shifting means extending through the housing and arranged to disconnect the gear means connecting the first auxiliary shaft to the main shaft, and a second gear shifting means extending through the housing and arranged to disconnect the gear means connecting the second auxiliary shaft to the main shaft to simultaneously stop the brushes while continuing the traction means in operation.

STEPHEN R. TEAGER.